United States Patent [19]

Neundorfer

[11] E Patent Number: Re. 32,723

[45] Reissued Date of Patent: Aug. 2, 1988

[54] APPARATUS FOR DESLAGGING STEAM GENERATOR TUBES

[75] Inventor: Mark H. Neundorfer, Houston, Tex.

[73] Assignee: Neundorfer, Inc., Willoughby, Ohio

[21] Appl. No.: 11,333

[22] Filed: Feb. 4, 1987

Related U.S. Patent Documents

Reissue of:

[64] Patent No.: 4,497,282
Issued: Feb. 5, 1985
Appl. No.: 554,616
Filed: Nov. 23, 1983

[51] Int. Cl.[4] ..... F22B 37/18; F22B 37/48

[52] U.S. Cl. ..... 122/379; 165/84; 165/95

[58] Field of Search ..... 122/379; 165/84, 95

[56] References Cited

U.S. PATENT DOCUMENTS

| | | | |
|---|---|---|---|
| 3,721,217 | 3/1973 | Willach et al. | 122/379 |
| 3,835,817 | 9/1974 | Tuomaala | 122/379 |
| 3,971,343 | 7/1976 | Ulrich et al. | 122/379 |
| 4,018,267 | 4/1977 | Tomasicchio | 122/379 X |

*Primary Examiner*—Edward G. Favors
*Attorney, Agent, or Firm*—Michael Sand Co.

[57] ABSTRACT

An apparatus for deslagging tubes in a modern high temperature steam generator by the application of high frequency shock energy is disclosed. The apparatus includes a pneumatic vibrator, a connecting shaft connected at one end to the vibrator by an interference fit tapered connection for transmission of high frequency shock energy from the vibrator to the shaft, a base plate for distributing the high frequency shock energy over a relatively large area encompassing portions of at least a plurality of tubes, the base plate being connected to the other end of the connection shaft by an interference fit tapered connection for transmission of high frequency shock energy from the shaft to the base plate, and the base plate being secured in position adjacent the tubes for the transmission of high frequency shock energy from the base plate to the tubes while allowing for thermal expansion of the tubes during operation of the steam generator.

19 Claims, 8 Drawing Sheets

1
2
3
4
5
6
7
8
9
10
11
12
13
14
15
17
18
19
II

APPARATUS FOR DESLAGGING STEAM GENERATOR TUBES

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to an improved apparatus for deslagging tubes in a steam generator by the application of high frequency shock energy.

It is well known that in the operation of a steam generator slag builds up on the tubes or heat transfer surfaces from the soot and ash which accumulate thereon. This slag causes a great loss of heat and seriously impairs the efficiency of the steam generator unless it is removed frequently and thoroughly. Slag which has built up on roof tubes of a steam generator also poses a safety menace because it may fall on maintenance personnel working inside of the steam generator furnace. Numerous devices and methods have been proposed to clean or deslag such tubes but all have certain limitations and disadvantages and none are wholly satisfactory.

Removing slag from steam generator tubes has also become more difficult and expensive as steam generators have increased in size and replacement power costs have increased. With certain steam generator designs, for example, there is limited access to problem areas because of fewer access doors. With a wide furnace, the doors may be too far apart to attack the accumulated slag manually. Increased steam generator height also means that the falling slag's destructive force is multiplied due to its increased terminal velocity. For example, a 100-lb slag fragment has an impact force of 14,000 ft/lbs based on a 150-ft fall versus 9,938 ft/lbs for a 100-ft fall. Obviously, a hard hat offers little or no protection from this large a threat.

Several techniques for removing the slag from the tubes of such large steam generators have been tried by maintenance personnel but found unsuccessul. These include water sprays which provide some thermal shock and impact, but generally not enough to provide significant removal; shotgun blasts which have insufficient impact to dislodge slag; soot blowers which cause tube erosion, adding to the problem; and air hammers applied at random to the tubes which are potentially damaging to the tubes and the operation of which is hot and dusty work requiring very short worker shifts to prevent heat exhaustion.

There have also been numerous arrangements proposed for vibration cleaning of heat exchange tubes. For example, Russian Pat. Nos. 309,223 and 454,413 disclose arrangements wherein horizontal coil tubes in a gas duct are fixed on support beams which in turn are connected to vibrator. The support beams are able to move in the gas duct and transmit vibration from the vibrators to the tubes. However, this type of arrangement may not be practical for large steam generators where sealing problems become difficult because of the high pressures therein during operation and where the size of support beams is too great because of the steam generator size. Further, the tubes are generally not suspended for movement in such large steam generators but are secured to stationary components of the steam generator as in the case of the roof tubes in a large steam generator which are securely connected to stationary support beams. In these large steam generators temperatures as high as 4000° F. may also require the use of exotic metal beams or cooling.

Another vibration cleaning technique is that proposed in U.S. Pat. No. 4,018,267 where the tubes are suspended for movement within the heat exchanger and are oscillated with an amplitude of vibration such that the tubes impact against each other to jar the slag or dust accumulations therefrom. Special suspension arrangements are necessary to mount the tubes so that they may move in this manner. Therefore, this technique is not suitable for large radiant type steam generators wherein the tubes are normally securely fixed in position. The shock on impact of the tubes may also cause stress problems at the elevated temperature found in modern steam generation. Moreover, this known technique may be problematical because of the seals which are required about the moving parts. These seals must withstand high pressures in the case of large steam generators as noted above.

It has also been disclosed that for off-line vibration cleaning of roof tubes in a steam generator, the impact from a pneumatic vibrator may be transmitted to the roof tubes by way of a buckstay or wide flange beam of the steam generator which carries the roof tubes. This technique has been found lacking, however, because a significant percentage of accumulated slag cannot be removed from the tubes during cleaning. One possible explanation for this is the inefficient transfer of the high frequency shock energy from the vibrators to the tubes via the buckstays. Such an arrangement is also impractical for use with other tubes of the steam generator such as nose end tubes, superheater tubes and sidewall tubes which are not supported from the buckstays or wide flange beams of the steam generator in a manner permitting the transmission of impact from the vibrators to the tubes.

Thus, an object of the present invention is to provide an improved apparatus for deslagging tubes in a steam generator which avoids the aforementioned disadvantages associated with the known techniques. More particularly, an object of the present invention is to provide an apparatus for deslagging tubes in a steam generator by the application of high frequency shock energy whereby high frequency shock energy is efficiently transmitted from a vibrator which may be located outside of the steam generator to tubes located in the steam generator.

An additional object of the invention is to provide an apparatus for deslagging tubes in a steam generator by the application of high frequency shock energy wherein the tubes of the steam generator need not be suspended for large amplitude oscillatory movement but may be securely fixed in position to a support beam or other structure at various locations within the steam generator.

These and other objects of the invention are attained by providing an apparatus comprising vibrator means for producing high frequency shock energy, base plate means for distributing the high frequency shock energy over a relatively large area encompassing portions of a plurality of steam generator tubes, and means connecting the vibrator means to the base plate means for transmitting high frequency shock energy from the vibrator to the base plate means, the connecting means including at least one interference fit tapered connection, and wherein means are provided for securing the base plate means in a position adjacent the plurality of tubes while allowing for thermal expansion of the tubes during operation.

According to one disclosed embodiment of the invention, the tubes to be deslagged are roof tubes of a steam generator which are supported at a plurality of spaced locations along their length from beams of the steam generator. In this embodiment, the base plate means of the apparatus is located against the upper surface of the roof tubes at a position spaced from the beams supporting the tubes. The roof tubes are defined by a roof tube membrane of the steam generator. The means securing the base plate means in position adjacent the roof tubes includes clips which are secured to the tube membrane and extend along side of and over the base plate means thereby retaining the base plate means in position against the tubes to effect good transmission of energy while allowing for thermal expansion of the tubes during operation of the steam generator. The vibrator means is a pneumatic vibrator which is located above a penthouse roof of the steam generator in the disclosed arrangement. The connecting means of the apparatus includes shaft means which extends from the vibrator down into the steam generator to the base plate means for transmitting high frequency shock energy from the vibrator to the base plate means. The shaft means is connected at its ends to the vibrator and the base plate means by respective interference fit tapered connections.

In another application of the invention, the tubes to be deslagged are parallel nose tubes of the steam generator, a portion of the nose tubes extending inwardly and upwardly from a sidewall of the steam generator. The base plate means of the apparatus of the invention contacts the inwardly and upwardly extending portions of the tubes. The means securing the base plate means in position adjacent the tubes includes clips which are secured to the tubes about the base plate means and which extend along side of and over the base plate means thereby retaining the base plate means in position against the tubes while allowing for thermal expansion of the tubes during operation of the steam generator. The parallel nose tubes of the steam generator are supported in part by hanger rods which are connected to the inwardly and upwardly extending portions of the tubes. The base plate means of the apparatus is located against the upper surface of the inwardly and upwardly extending portions of the tubes at a position spaced from these hanger rods. The connecting means of the apparatus includes a shaft means connected at one end to the vibrator means by an interference fit tapered connection for transmission of high frequency shock energy from the vibrator means to the shaft means, with the base plate means being connected to the other end of the shaft means by an interference fit tapered connection for transmission of high frequency shock energy from the shaft means to the base plate means. The shaft means extends obliquely with respect to the plane of the nose tubes at the base plate means and toward a side wall of the steam generator.

In another embodiment of the invention, the tubes for deslagging are side wall tubes of a steam generator which are defined by a tube membrane. In this application, the means securing the base plate means in position adjacent the tubes includes a plurality of fasteners which are connected to the tubes and which extend with clearance through openings in the base plate means to allow for thermal expansion of the tubes during operation. Means are provided on the fasteners for resiliently biasing the base plate means against the tubes. The connecting means of the apparatus includes a pin plate which is located intermediate the base plate means and the means for resiliently biasing the base plate means. The pin plate is connected to the vibrator means by at least one interference fit tapered connection. In the disclosed arrangement, the fasteners are connected to the tube membrane by welds.

In another embodiment of the invention, the tubes to be deslagged are two rows of spaced parallel essentially vertically extending superheater tubes of the steam generator. The vibrator means of the apparatus is located between the two rows of tubes and is coupled by the connecting means to two base plate means contacting the respective rows of superheater tubes. Each of the two base plate means extends in a direction at right angles to the longitudinal direction of the superheater tubes. The means securing the two base plate means in a position adjacent the tubes includes a contoured surface on each of the base plate means which receive the plurality of superheater tubes and tangentially surround portions thereof to prevent lateral shifting of the base plate means with respect to the tubes while allowing for the thermal expansion of the tubes, especially in the longitudinal direction, during operation.

In each of the disclosed embodiments of the invention, the apparatus preferably includes a plurality of vibrator means for producing high frequency shock energy. The vibrators are located at a plurality of spaced locations spaced from the tubes of the steam generator to be deslagged. A plurality of base plate means for distributing the high frequency shock energy over a relatively large area encompassing portions of a plurality of the tubes are provided. Each of the base plate means is located against the surface of the tubes at a position spaced from the support means for the tubes. A plurality of connecting means connect the vibrators to the respective base plate means for transmitting high frequency shock energy from the vibrators to the base plate means. Each of the connecting means includes at least one interference fit tapered connection. Means are provided for securing the base plate means in position adjacent the tubes while allowing for thermal expansion of the tubes during operation of the steam generator.

The disclosed embodiments illustrate the application of the invention for deslagging roof tubes, nose tubes, side wall tubes and superheater tubes of a steam generator. The invention may also be used to deslag tubes in other areas of the steam generator, such as the throat. Thus, by means of the invention it is possible to efficiently deslag the various tubes of a large steam generator. Moreover, since special suspensions for the boiler tubes need not be employed, the apparatus of the invention can be readily adapted to existing steam generators to improve operating efficiency and reduce the risks of injury to maintenance personnel. The invention is also useful for deslagging tubes of operating, as well as off-line steam generators.

These and other objects, features and advantages of the present invention will become more apparent from the following description when taken in connection with the accompanying drawings which show, for purposes of illustration only, several embodiments in accordance with the invention.

DETAILED DESCRIPTION OF THE DISCLOSED EMBODIMENTS

Figure 1:
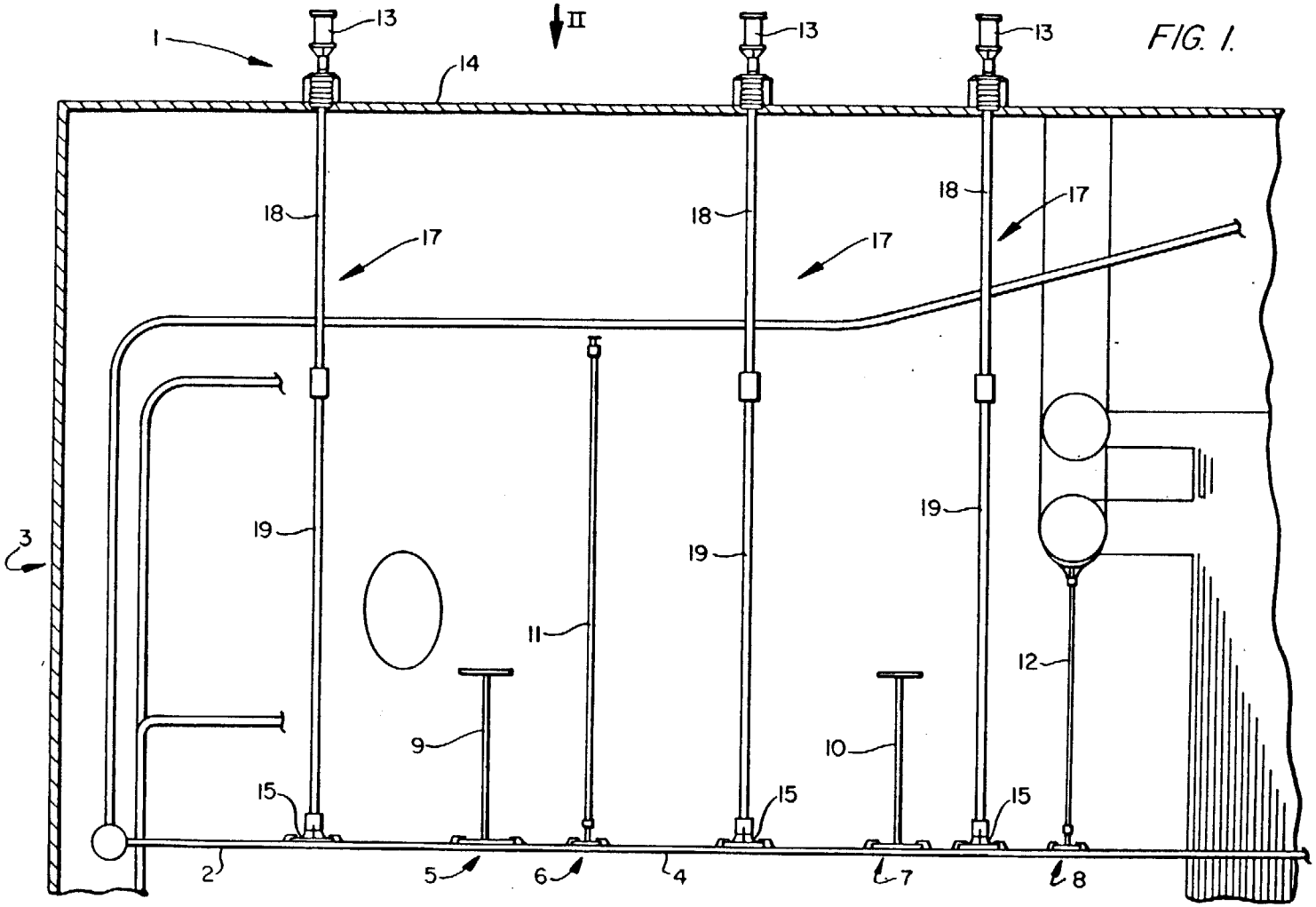
FIG. 1 is a schematic, vertical section of a portion of a steam generator provided with tube deslagging apparatus according to the present invention.

Referring now to the drawings, FIGS. 1–4 illustrate an apparatus 1 of the invention for deslagging roof tubes 2 in a boiler 3 of a large utility steam generator by the application of high frequency shock energy. The plurality of parallel roof tubes 2 are integrally formed as part of a roof tube membrane 4 which is supported from above at a plurality of spaced locations 5–8 along the length of the tubes from buckstays or I-beams 9 and 10 and existing support hangers 11 and 12 of the boiler.

Figure 4:
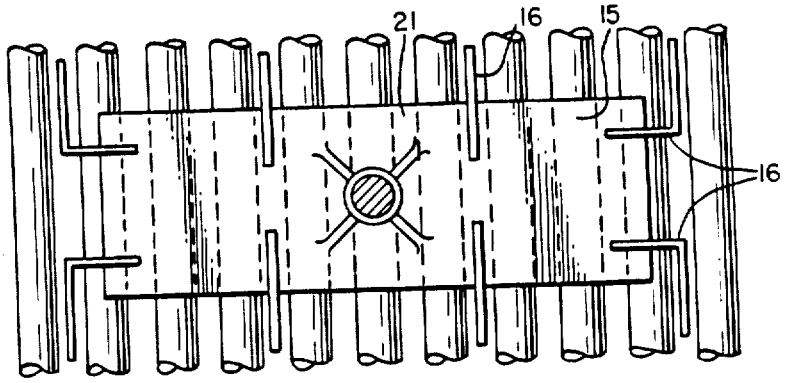
FIG. 4 is a sectional view of the apparatus of FIG. 3 taken along the line IV—IV and showing the base plate for distributing the high frequency shock energy over a relatively large area encompassing portions of a plurality of tubes.

The apparatus 1 comprises a plurality of vibrators 13 for producing high frequency shock energy. The vibrators are preferably base biased impacting pneumatic rappers such as the Rapper-3 air vibrator manufactured by National Air Vibrator Company. The vibrators 13 are located at a plurality of spaced locations above the roof tubes 2. More specifically, the vibrators 13 are located outside the boiler 3 above the penthouse roof 14 of the boiler. A plurality of base plates 15 are provided for distributing high frequency shock energy over a relatively large area tangential to the tubes and encompassing portions of a plurality of the roof tubes 2. Each of the base plates 15 is located against the outer surface of the roof tubes 2 of the membrane 4 at a position spaced from the beams 9 and 10 and support hangers 11 and 12 supporting the tubes. As shown in FIG. 4, the base plates 15 have a rectangular configuration which is elongate in a direction at right angles to the longitudinal direction of the tubes 2. The base plates 15 are preferably formed of a metal such as steel or stainless steel and secured in position adjacent the tubes 2 by means of metal clips 16. The clips 16 are secured to the tubes 2 as by welding and extend upwardly alongside of and over the base plates 15 thereby retaining the base plates in position against the tubes to effect good transmission of energy, while at the same time permitting thermal expansion of the tubes during operation of the steam generator.

Figure 3:
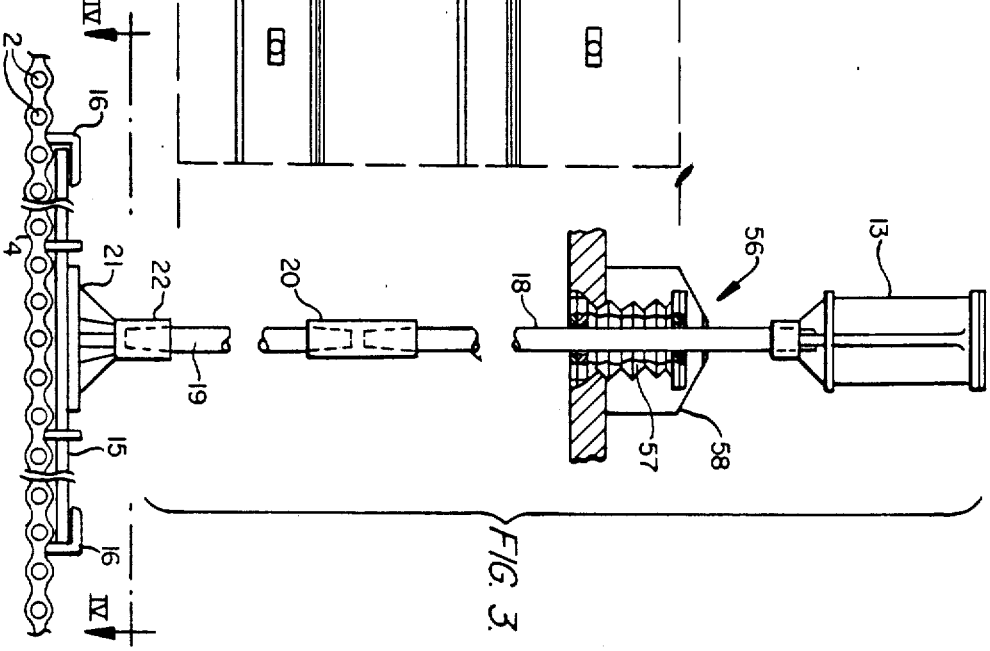
FIG. 3 is a detailed side elevation of one apparatus of FIG. 1 for deslagging the tubes of the roof tube membrane of the steam generator by the application of high frequency shock energy.

The base plates 15 are connected to respective vibrators 13 by connecting means 17 for transmitting high frequency shock energy from the vibrators to the base plates. Each of the connecting means 17 includes shafts 18 and 19 whose ends are tapered. The upper tapered end of the shaft 18 is received in a cooperating tapered bore in the base of the vibrator 13 and the lower tapered end of the shaft 18 is received in a correspondingly tapered bore in a double socket coupler 20 as shown in FIG. 3. The lower shaft 19 extends between the coupler 20 and a square pinplate 21 mounted on the base plate 15 by welding, for example. The tapered ends of the shaft 19 are received in cooperating tapered bores in the coupler 20 and a receptacle 22 mounted on the pinplate 21. The tapered connections from a vibrator 13 through a base plate 15 are driven to an interference fit by the action of the vibrator. The tapered connections are the most efficient type connections for the transmission of shock energy. Thus, the energy generated by a pneumatic vibrator 13 and transferred through the tapered connections and steel shafts 18 and 19 is transmitted to the tubes 2 via contact with the base plate 15.

Cleaning or deslagging of the tubes 2 of the tube membrane 4 is effected by continuously generated shock energy from the vibrators 13 and does not depend on high amplitude displacement or a moving striker bar extending into the boiler. The high frequency shock energy transferred to the tube surfaces establishes a differential shear between the cooled and relatively brittle surface of the slag and the tube surface causing separation of the slag. Therefore, the invention is not limited to use with pendant type tubes but is applicable to the several types of tubes found in large utility steam generators including roof tubes, side wall tubes, nose end tubes, superheater tubes, other radiant section tubes, and convective section tubes as discussed more fully hereinafter.

Figure 5:
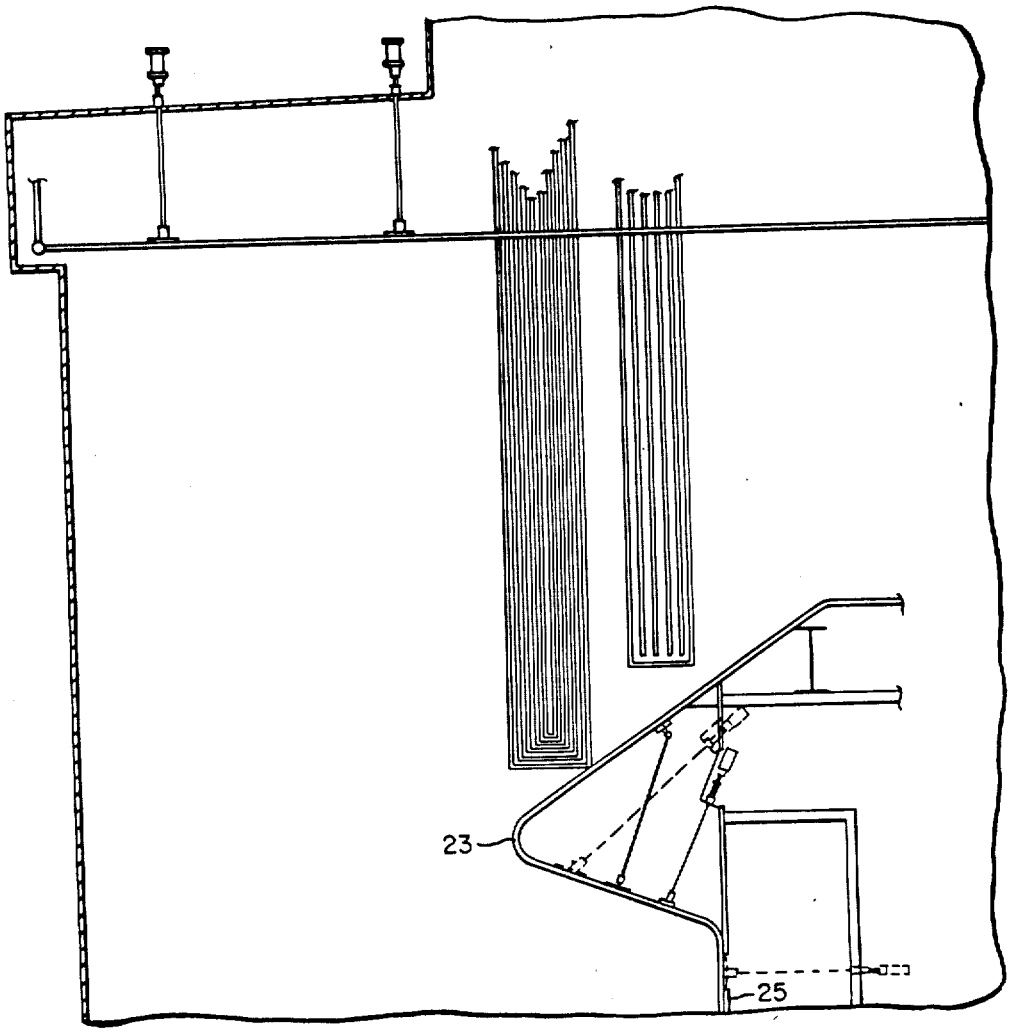
FIG. 5 is a schematic, vertical section of a portion of the steam generator of FIG. 1 illustrating a second embodiment of the invention for deslagging nose tubes of the steam generator.
Figure 6:
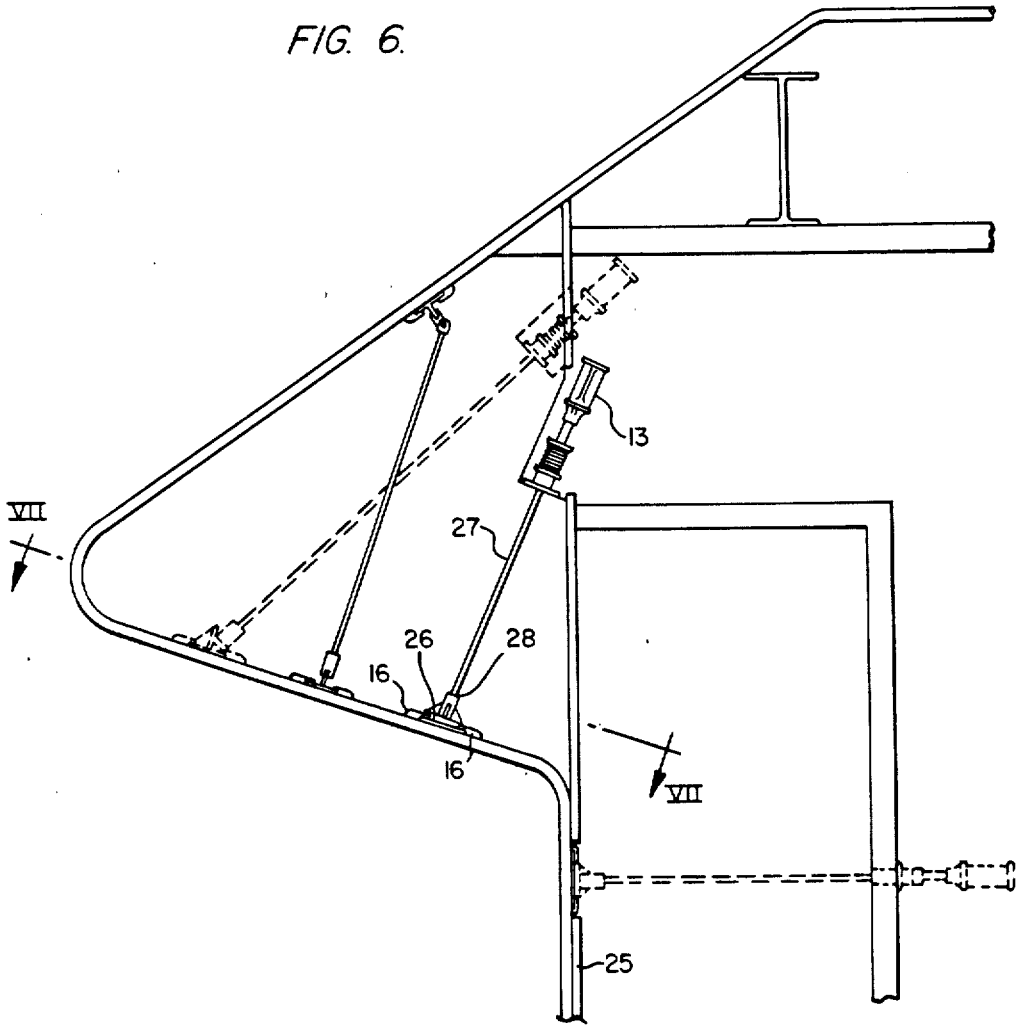
FIG. 6 is a detailed, side elevation of the apparatus for deslagging the nose tubes of the boiler of FIG. 5.
Figure 7:
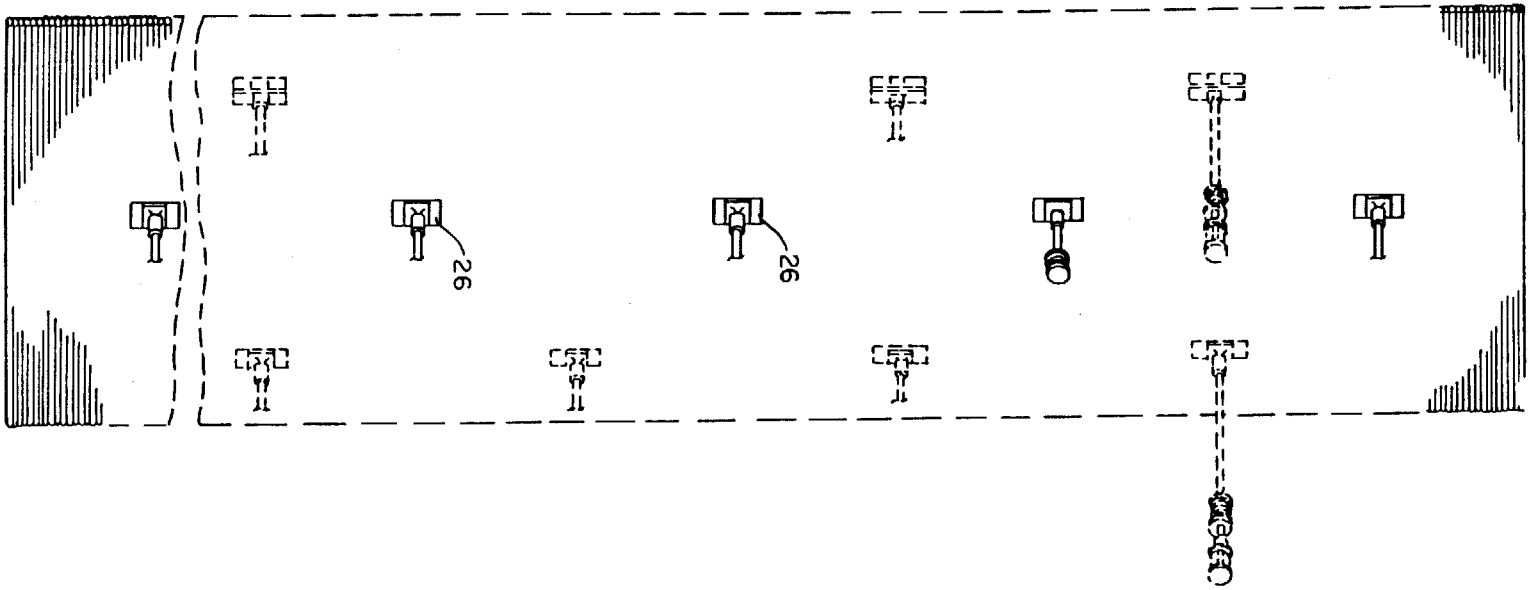
FIG. 7 is a sectional view of a portion of the apparatus of FIG. 6 taken along the line VII—VII.

As depicted in FIGS. 5–7, an apparatus of the invention is used to deslag a plurality of parallel nose tubes 23 defined by a tube membrane wall of the boiler 3. A portion 24 of each of the V-shaped nose tubes 23 extends inwardly and upwardly from a side wall 25 of the boiler. An elongated base plate 26 of the apparatus contacts the inwardly and upwardly extending portions 24 of the tubes 23 and extends at right angles to the tubes as shown in FIG. 7. A shaft 27 having tapered ends extends obliquely with respect to the plane of the tubes at the base plate 26 and toward the side wall 25 of the boiler where it is coupled to the vibrator 13 by way of a tapered interference fit coupling of the type referred to above. The other end of the shaft 27 is likewise coupled to the base plate 26 where is received in a cooperating tapered bore of a receptacle 28 mounted on the elongated base plate 26. Clips 16 secure the base plate in position adjacent the nose tubes 23 in the manner described above. The base plate 26 is spaced from the hanger rods 29 which help support the nose end tubes within the boiler. Additional possible locations for apparatus of the invention are illustrated in dashed lines in FIGS. 5–7.

Figure 9:
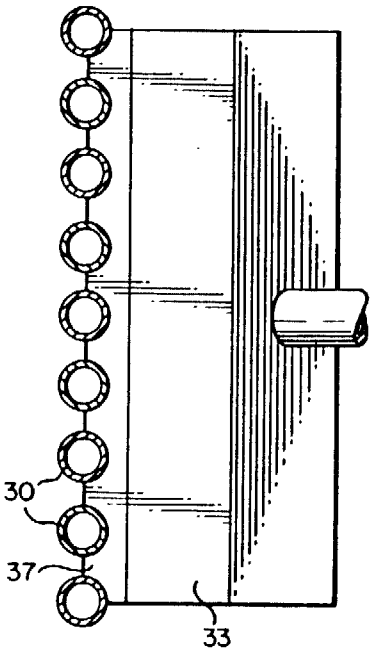
FIG. 9 is a sectional view of a base plate of the apparatus of FIG. 8 taken along the line IX—IX.
Figure 8:
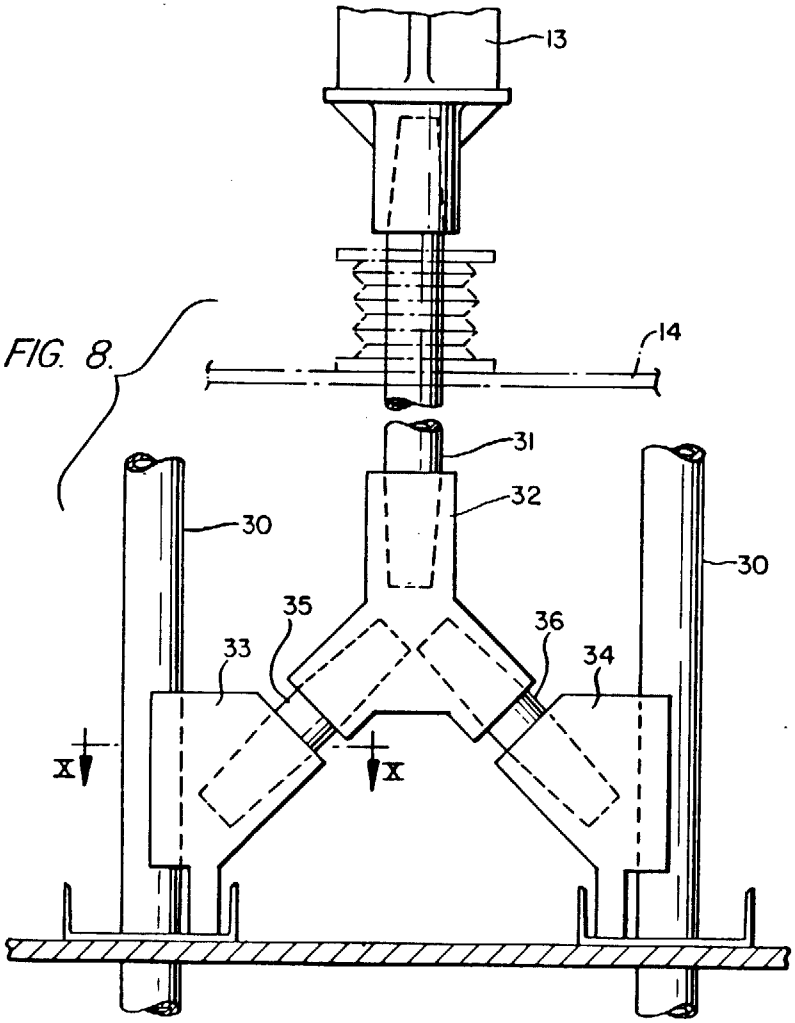
FIG. 8 is a side elevation of an additional embodiment of the invention showing an apparatus for deslagging superheater tubes of a steam generator.

In the embodiment of the invention illustrated in FIGS. 8 and 9, an apparatus of the invention is used to deslag spaced parallel essentially vertically extending superheater tubes 30 of a steam generator. The apparatus includes a steel shaft 31 which extends downwardly from a vibrator 13 above the penthouse roof 14 of the boiler between two rows of the spaced parallel essentially vertically extending superheater tubes 30. The shaft 31 is intermediate and essentially parallel with the two rows of tubes 30. A special 3-way coupler 32 transmits energy from the lower end of the shaft 31 to each of a pair of elongate base plates 33 and 34 by way of short shafts 35 and 36, respectively. Tapered interference fit connections are employed between the several shafts 31, 35 and 36 and the various parts of the apparatus as illustrated in FIGS. 8 and 9.

Figure 10:
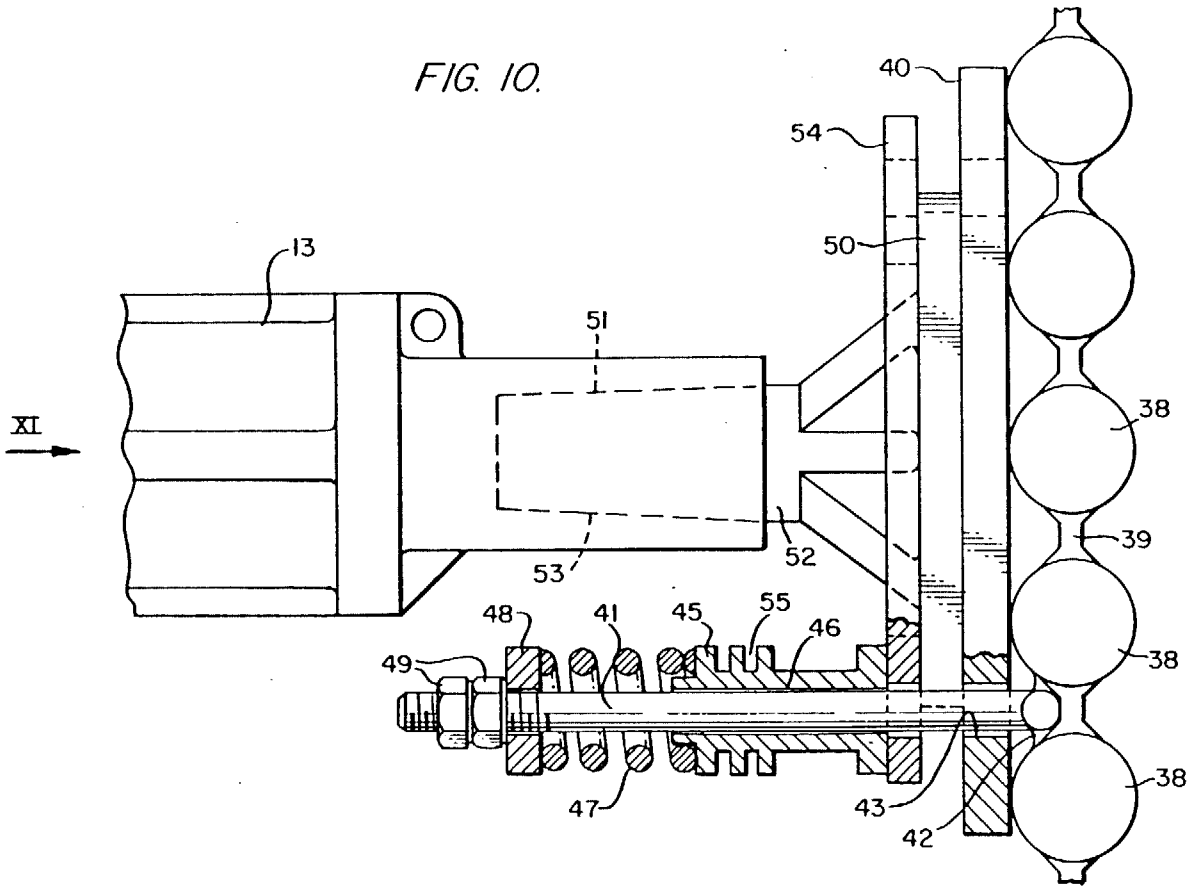
FIG. 10 is an elevational view, partially in cross section, of another embodiment of the invention for deslagging sidewall tubes of a steam generator.

Each of the base plates 33 and 34 extends in a direction at right angles to the longitudinal direction of the superheater tubes as shown in FIG. 10. Further, according to an additional feature of the present invention the surfaces 37 of the base plates 33 and 34 in contact with the superheater tubes 30 are contoured, that is formed with a plurality of grooves to receive a plurality of the superheater tubes and to tangentially surround portions thereof. This, and clips (not shown) of the aforementioned type, secure the base plates 33 and 34 in position adjacent the tubes 30 and aid in the efficient transfer of shock energy to the tubes for slag removal while allowing the tubes to expand with heating during operation of the steam generator. The base plates 15 and 26 in the previous embodiments may also be grooved in this manner to more efficiently transfer shock energy to the adjacent tubes for slag removal and to help secure the base plates in position adjacent the tubes.

Figure 11:
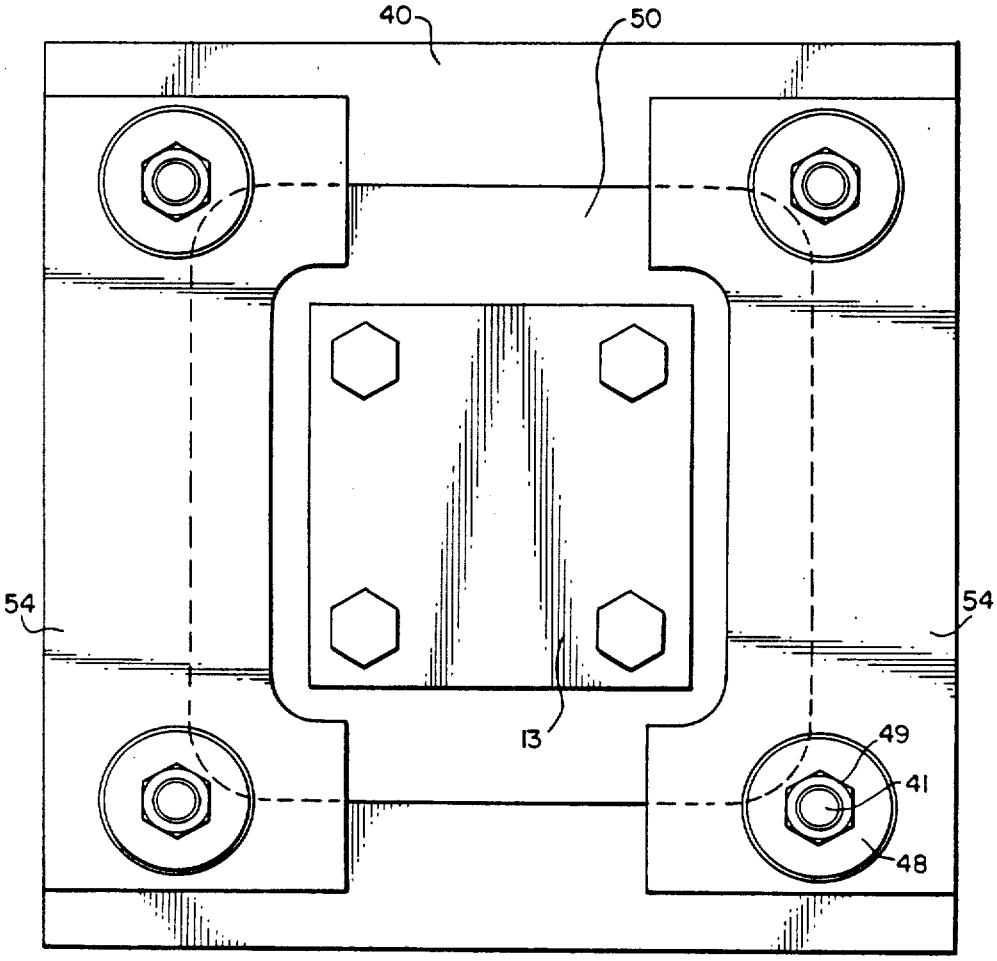
FIG. 11 is a top view of the apparatus of FIG. 10 taken in the direction of arrow XI.

In the embodiment illustrated in FIGS. 10 and 11 of the drawings, an apparatus of the invention is provided for deslagging side wall tubes 38 of a vertically extending tube membrane 39 defining a wall of a steam generator. In this embodiment, a base plate 40 is secured in position adjacent the tubes 38 by means of a plurality of fasteners 41 in the form of Tee bolts which are connected to the tube membrane by welds 42. The fasteners extend with clearance through openings 43 in the base plate 40 to allow the thermal expansion of the tubes during operation of the steam generator. Means 44 are provided on the fasteners for resiliently biasing the base plate 40 against the side wall tubes 38. In the illustrated embodiment, the means 44 comprises a spacer 45 having a bore 46 therethrough for receiving a fastener, a spring 47, washer 48 and hex nuts 49. The spring 47 may be a coil spring which is placed under compression between the washer 48 and the end of the spacer 45 when the hex nuts 49 are threaded on the free end of the fastener 41 as shown in FIG. 10 to thereby resiliently bias the backing plate against the side wall tubes 38.

Connecting the vibrator 13 to the base plate 40 is a pinplate 50 which is located intermediate the base plate and the means 44 for resiliently biasing the base plate against the side wall tubes. The pinplate 50 is connected to the vibrator 13 by way of a tapered interference fit coupling 51 between a tapered male pin securely mounted on the pinplate 50 and a cooperating tapered recess 53 in the base of the pneumatic vibrator 13. In particular, as shown in FIG. 10, the end of the spacer 45 closest to the side wall tubes 38 contacts a clamping plate 54. The pinplate 50 is retained in position against the base plate 40 by means of a pair of these clamping plates 54 in cooperation with four of the fasteners 41 with respective resilient biasing means 44 thereon. In this regard it is noted that the design of the spacer 45 of the biasing means 44 includes openings 55 for cooling by convection. The spacer is preferably constructed of a high temperature material such as stainless steel. A plurality of the vibrators 13 with base plates 40 and connecting means 50 are provided at spaced intervals along the tube membrane 39 for deslagging. As in the previously described embodiments, the base plates 40 are preferably spaced from the supporting means for the tube membrane 39.

In each of the disclosed embodiments of the invention, the vibrator 13 of the apparatus is located outside of the boiler, although not necessarily completely outside of the steam generator. This is advantageous in that it places the vibrator 13 in a position where it is readily accessible for service and repair. However, with such arrangements, the shaft or connection means of the invention must extend through the boiler or steam generator thereby necessitating the use of a high temperature seal 56 about the shaft as shown in FIG. 3. The seal 56 can be formed, for example, with a flexible stainless steel high temperature sealing member 57 and a clamp-on collar 58 as depicted in FIG. 3. Of course, other arrangements could be employed without departing from the invention. For example, it is envisioned that the vibrators of the apparatus could be located within the steam generator, such as beneath the penthouse roof in the penthouse area above the roof tubes or superheater tubes which are to be deslagged. This would permit the use of a shorter connection means or shaft between the vibrator and the base plate of the apparatus thereby increasing the transmission efficiency for deslagging. However, where the vibrators are located within the penthouse of the boiler or elsewhere within the steam generator, they must be able to withstand the relatively high temperatures which occur there. Temperatures of 600° to 800° F. may occur in the penthouse of the boiler, for example.

Figure 2:
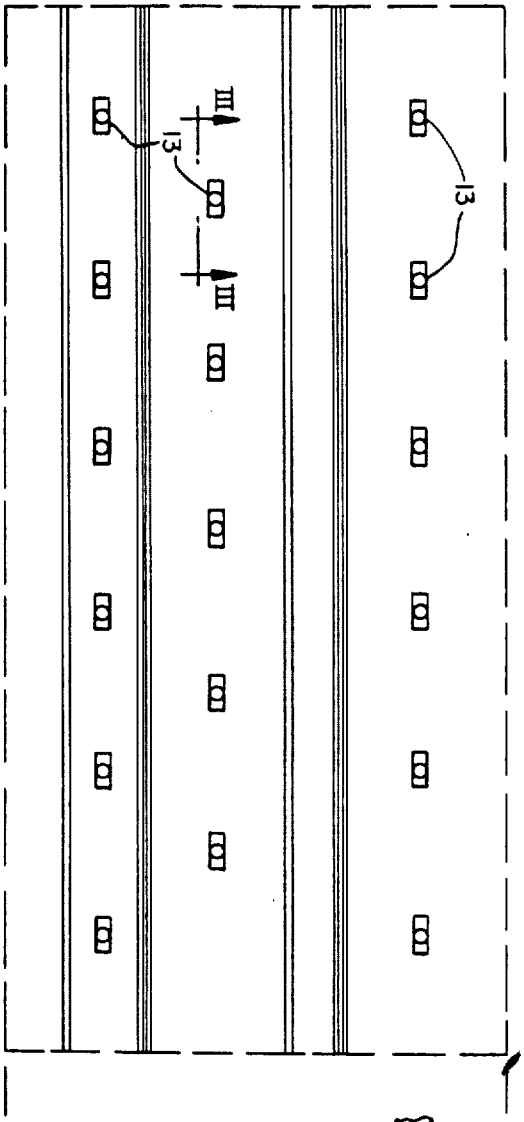
FIG. 2 is a top view of the penthouse roof of the steam generator taken in the direction of arrow II in FIG. 1.

The apparatus of the invention are useful to deslag the steam generator tubes at the beginning of an outage to reduce the chances of slag falling on maintenance personnel in the boiler. After a cool-down time of about 4 hours which allows the slag to partially solidify, the vibrators may again be vibrated for a short period of a few minutes to drop additional slag into the ash pit of the boiler. If the boiler outage is to be long, another rapping interval may be employed. Three to four days after the initial rapping, the boiler can be cleared of personnel, and the roof tubes or other tubes struck again. This latter interval is needed to remove additional slag which has not cooled enough to be brittle at the eariler rappings. Specifically, as it cools, slag is transformed from a viscose to a brittle substance, which is easily fractured if struck properly. Cooling also creates stress fractures which make removal easier, but necessitates further rapping for safety's sake. Because the vibrators will influence an area within a radius of five to ten feet of the shaft center line of the apparatus, due in part to the spacing from the tube support means, the vibrators need only be spaced at intervals of ten feet or the like as illustrated in FIG. 2 between the supporting beams and hanger rods to effect removal of the accumulated slag. The invention is also useful for deslagging tubes during the operation of the steam generator thereby reducing the frequency of shutdowns for cleaning purposes and increasing the operating efficiency of the steam generator.

While I have shown and described only several embodiments in accordance with the present invention, it is understood that the same is not limited thereto, but is susceptible to numerous changes and modifications as are known to those skilled in the art. Therefore, I do not wish to be limited to the details shown and described herein, but intend to cover all such changes and modifications as are encompassed by the scope of the appended claims.

I claim:

1. Apparatus for deslagging parallel tubes in a steam generator by application of high frequency shock energy comprising vibrator means for producing high frequency shock energy, base plate means extending across and contacting portions of each of a plurality of said parallel tubes for distributing said high frequency shock energy over a relatively large area of said plurality of tubes, means connecting said vibrator means to said base plate means for transmitting high frequency shock energy from said vibrator means to said base plate means, [said connecting means including at least one interference fit tapered connection,] and wherein means are provided for securing the base plate means in a position against the plurality of tubes to effect good transmission of high frequency shock energy while permitting thermal expansion of the tubes during operation of said steam generator.

2. An apparatus for deslagging tubes in a steam generator by application of high frequency shock energy comprising vibrator means for producing high frequency shock energy, base plate means contacting said tubes for distributing said high frequency shock energy over a relatively large area encompassing portions of a plurality of said tubes, means connecting said vibrator means to said base plate means for transmitting high frequency shock energy from said vibrator means to said base plate means, [said connecting means including at least one interference fit tapered connection,] wherein means are provided for securing the base plate means in a position adjacent the plurality of tubes while allowing for thermal expansion of the tubes during operation, and wherein said means securing the base plate means in position adjacent said tubes includes clips which are secured to said tubes about said base plate means and which extend alongside of and over said base plate means, thereby retaining said base plate means in position against said tubes while allowing for thermal expansion of the tubes during operation of the steam generator.

3. An apparatus for deslagging tubes in a steam generator by application of high frequency shock energy comprising vibrator means for producing high frequency shock energy, base plate means contacting said tubes for distributing said high frequency shock energy over a relatively large area encompassing portions of a plurality of said tubes, means connecting said vibrator means to said base plate means for transmitting high frequency shock energy from said vibrator means to said base plate means, [said connecting means including at least one interference fit tapered connection,] wherein means are provided for securing the base plate means in a position adjacent the plurality of tubes while allowing for thermal expansion of the tubes during operation, and wherein said means securing said base plate means in position adjacent said tubes includes a plurality of fasteners which are connected to said tubes and which extend with clearance through openings in said base plate means to allow for thermal expansion of the tubes during operation, wherein means are provided on said fasteners for resiliently biasing said base plate means against said tubes.

4. An apparatus for deslagging tubes according to claim 3, wherein said connecting means includes a pinplate which is located intermediate said base plate means and said means for resiliently biasing said base plate means, said pinplate being connected to said vibrator means by said at least one interference fit tapered connection.

5. An apparatus for deslagging tubes according to claim 3, wherein said tubes are side wall tubes of a steam generator which are defined by a tube membrane.

6. An apparatus for deslagging tubes according to claim 5, wherein said fasteners are connected to said tube membrane by welds.

7. An apparatus for deslagging tubes according to claim 1, wherein said base plate means is elongated and extends in a direction transverse to the longitudinal direction of said tubes.

8. An apparatus for deslagging tubes according to claim 1, wherein said tubes are the roof tubes of a steam generator which are supported at a plurality of spaced locations along their length from beams of said steam generator, said base plate means being located against the upper surface of said roof tubes at a position spaced from the beams supporting said tubes.

9. An apparatus for deslagging tubes according to claim 8, wherein said roof tubes are defined by a roof tube membrane of the steam generator.

10. An apparatus for deslagging tubes according to claim 9, wherein said means securing said base plate means in position adjacent said roof tubes includes clips which are secured to said tube membrane and extend alongside of and over said base plate means, thereby retaining said base plate in position against said membrane while allowing for thermal expansion of the tubes during operation of the steam generator.

11. An apparatus for deslagging tubes according to claim 8, wherein said vibrator means is located above a penthouse roof of said steam generator, and said connecting means includes shaft means which extends from said vibrator means down into said steam generator to said base plate means for transmitting high frequency shock energy from the vibrator means to the base plate means, said shaft means being connected at its ends to said vibrator means and said base plate means by respective interference fit tapered connections.

12. An apparatus for deslagging tubes according to claim 1, wherein said tubes include a plurality of parallel nose tubes, a portion of said nose tubes extending inwardly and upwardly from a side wall of said steam generator, said base plate means contacting the inwardly and upwardly extending portions of said tubes.

13. An apparatus for deslagging tubes in a steam generator by application of high frequency shock energy comprising vibrator means for producing high frequency shock energy, base plate means contacting said tubes for distributing said high frequency shock energy over a relatively large area encompassing portions of a plurality of said tubes, means connecting said vibrator means to said base plate means for transmitting high frequency shock energy from said vibrator means to said base plate means, [said connecting means including at least one interference fit tapered connection,] and wherein means are provided for securing the base plate means in a position adjacent the plurality of tubes while allowing for thermal expansion of the tubes during operation, wherein said tubes include a plurality of parallel nose tubes, a portion of said nose tubes extending inwardly and upwardly from a side wall of said steam generator, said base plate means contacting the inwardly and upwardly extending portions of said tubes, and wherein support means for said tubes includes hanger rods connected to the inwardly and upwardly extending portions of said tubes, said base plate means being located against the upper surface of the inwardly and upwardly extending portions of said tubes at a position spaced from said hanger rods.

14. An apparatus for deslagging tubes according to claim 13, wherein said connecting means includes a shaft means connected at one end to said vibrator means by an interference fit tapered connection for transmission of high frequency shock energy from the vibrator means to the shaft means, and with said base plate means being connected to other end of said shaft means by an interference fit tapered connection for transmission of high frequency shock energy from the shaft means to said base plate means.

15. An apparatus for deslagging tubes according to claim 14, wherein said shaft means extends obliquely with respect to the plane of the nose tubes at the base plate means and toward a sidewall of said steam generator.

16. An apparatus for deslagging tubes according to claim 1, wherein said tubes includes two rows of spaced parallel essentially vertically extending superheater tubes of said steam generator, said vibrator means being coupled by said connecting means to two base plate means contacting the respective rows of superheater tubes.

17. An apparatus for deslagging tubes in a steam generator by application of high frequency shock energy comprising vibrator menas for producing high frequency shock energy, base plate means contacting said tubes for distributing said high frequency shock energy over a relatively large area encompassing portions of a plurality of said tubes, means connecting said vibrator means to said base plate means for transmitting high frequency shock energy from said vibrator means to said base plate means, said connecting means including at least one interference fit tapered connection, and wherein means are provided for securing the base plate means in a position adjacent the plurality of tubes while allowing for thermal expansion of the tubes during operation, wherein said tubes include two rows of spaced parallel essentially vertically extending superheater tubes of said steam generator, said vibrator means being coupled by said connecting means to two base plate means contacting the respective rows of superheater tubes, and wherein each of said two base plate means extends in a direction at right angles to the longitudinal direction of said superheater tubes and wherein said means securing said two base plate means in a position adjacent said tubes includes a contoured surface on each of said base plate means to receive a plurality of superheater tubes and to tangentially surround portions thereof.

18. An apparatus for deslagging tubes according to claim 1, wherein said means securing said base plate means in a position adjacent said tubes includes a contoured surface or said base plate means which contacts and receives the tubes and tangentially surround portions thereof.

19. An apparatus for deslagging parallel tubes in a steam generator by the application of high frequency shock energy, the tubes being supported in the steam generator at a plurality of spaced locations along their length by support means, comprising a plurality of pneumatic vibrators for producing high frequency shock energy, said vibrators being located at a plurality of spaced locations spaced from said tubes, a plurality of base plates for distributing the high frequency shock energy over a relatively large area encompassing portions of a plurality of said tubes, each of said plates extending across and contacting portions of each of a plurality of said parallel tubes at a position spaced from the support means for said tubes, and a plurality of connecting means connecting said vibrators to respective base plates for transmitting high frequency shock energy from said vibrators to said base plates, [each of said connecting means including at least one interference fit tapered connection,] and wherein means are provided for securing the base plates in position against said tubes to effect good transmission of high frequency shock energy while permitting thermal expansion of the tubes during operation of said steam generator.

* * * * *